Patented Dec. 11, 1951

2,578,178

UNITED STATES PATENT OFFICE 2,578,178

AZATHIAZOLONE CYANINE DYES AND THEIR PREPARATION

Henry G. Derbyshire, Johnson City, N. Y., assignor to General Aniline & Film Corporation, New York, N. Y., a corporation of Delaware No Drawing. Application December 16, 1949, Serial No. 133,473

12 Claims. (Cl. 260—305)

This invention relates to azathiazolone cyanine dyes suitable as intermediates for the manufacture of tri- and tetranuclear cyanine dyestuffs and to a method of preparing the same.

Accordingly, the principal object of the present invention is to provide azathiazolone dyes which are not only valuable as sensitizers per se but also valuable as intermediates in the preparation of tri- and tetranuclear dyes.

Another object is to provide a process of preparing the said azathiazolone cyanine dyes.

Other objects and advantages will appear hereinafter.

The azathiazolone cyanine dyes of the present invention are represented by the following general formula:

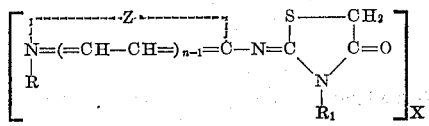

wherein $n$ represents 1 or 2, R represents an alkyl, allyl, aryl, or aralkyl group or substituted groups of this type, e. g., methyl, ethyl, propyl, butyl, isobutyl, n-amyl, isoamyl, hydroxyethyl, γ-hydroxypropyl, β-methoxyethyl, β-ethoxyethyl, benzyl, β-phenylethyl, menaphthyl, β-carboxyethyl, carboxymethyl, α-carboxyethyl, γ-carboxypropyl, β-acetoxyethyl, γ-acetoxypropyl, carbomethoxymethyl, β-carbomethoxymethyl, β-carboethoxymethyl, phenyl, α-naphthyl, β-naphthyl, o-tolyl, p-tolyl, naphthylmethyl, and the like, $R_1$ represents alkyl, allyl, aryl, or aralkyl group as in R, X represents an acid radical, e. g., chloride, bromide, iodide, etc., and Z represents the residue of a heterocyclic nitrogenous nucleus of the type common in cyanine dyes, e. g., oxazole, thiazole, selenazole, and their polycyclic homologues, such as those of the benzene, naphthalene, acenaphthene, and anthracene series, pyridine, and its polycyclic homologues, such as quinoline and α- or β-naphthaquinolines, indolenines, benzimidazoles, diazines, such as pyrimidines and quinazolines, thiazolines and selenazolines. The polycyclic compounds of this series may also be substituted in the carbocyclic rings with one or more groups, such as alkyl, i. e., methyl, ethyl, etc., aryl, i. e., phenyl, or amino, hydroxy, alkoxy, i. e., methoxy, ethoxy, etc., and methylenedioxy groups, or by halogen, i. e., chlorine, bromine, or iodine atoms.

I have found that azathiazolone cyanine dyes characterized by the foregoing general formula are readily obtained in good yields by condensing any 2-amino substituted heterocyclic quaternary ammonium salt of the type commonly used in cyanine dye synthesis with an aryl isothiocyanate in the presence of an acid binding agent. The resulting heterocyclic substituted thiourea is then condensed with an α-halogen acetic acid to yield an azathiazolone cyanine dyestuff. The condensation reaction between the 2-amino substituted heterocyclic quaternary ammonium salt and aryl isothiocyanate is conveniently effected in the presence of a basic tertiary organic amine as the condensing agent, such as triethylamine, tri-n-propylamine, and the like. Pyridine or its homologues may be used as a solvent-diluent in the presence of a tertiary organic amine.

The resulting substituted thiourea is then fused with an α-halogen acetic acid. The condensation reaction is effected by simply fusing the co-reactants or by heating them in a suitable solvent at a temperature ranging from 75–150° C. for a period of 5 minutes to 3 hours.

The preparation of the substituted thioureas is carried out by condensing a heterocyclic quaternary ammonium salt of the type commonly employed in cyanine dye synthesis and containing a reactive amino group in α- or γ-position to the ring nitrogen atom thereof with an alkyl, aryl, or aralkyl isothiocyanate in the presence of a base, such as triethylamine in pyridine solution. The reaction is believed to take place as follows:

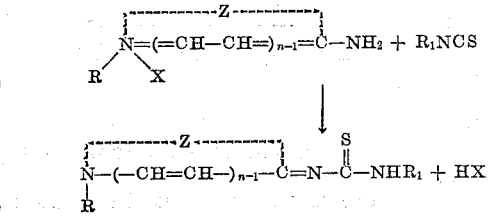

wherein $n$, R, X and Z have the same values as above, and $R_1$ represents an alkyl, aryl or aralkyl group of the same value as in R.

As typical examples of 2-amino heterocyclic nitrogenous quaternary salts, which are utilized in the condensation reaction with the alkyl, aryl, or aralkyl isothiocyanate, the following may be mentioned:

2-aminobenzthiazole ethiodide
2-aminobenzothiazole dimethylsulfate
2-aminobenzoxazole methiodide
2-amino-5-methylbenzoxazole methyl p-toluenesulfonate
2-aminobenzoselenazole methiodide
2-amino-4-phenyloxazole methiodide
2-amino-5-methylthiadiazole methiodide
2-amino-5-methyloxdiazole ethiodide
2-aminopyridine ethiodide
2-aminoquinoline ethiodide
4-aminoquinoline ethiodide
2-amino-α-naphthothiazole methiodide 2-amino-β-naphthothiazole ethiodide
2-amino-5-ethoxy-benzothiazole ethiodide
2-aminothiazole methiodide, and the like.

The following are examples of suitable alkyl, aryl, and aralkyl isothiocyanates:

Methyl isothiocyanate
Ethyl isothiocyanate
Allyl isothiocyanate
Phenyl isothiocyanate
α-Naphthyl isothiocyanate
β-Naphthyl isothiocyanate
o-Tolyl isothiocyanate
n-Tolyl isothiocyanate
p-Tolyl isothiocyanate
Benzyl isothiocyanate
Phenethyl isothiocyanate, and the like.

As examples of α-halogen acetic acids, the following may be mentioned: bromacetic acid, chloracetic acid, and iodoacetic acid.

The condensation reaction between the substituted thiourea and α-halogen acetic acid is carried out, as pointed out above, by simply heating the coreactants at a temperature ranging from 100–120° C. for 5 minutes to 3 hours. The reaction can also be effected by heating the coreactants in the presence of a liquid alcohol having a boiling point over 100° C. or acetic acid or anhydride for a few minutes at reflux or on a steam bath. I prefer for the sake of expediency to operate by heating the coreactants in the presence of butyl, amyl, or isobutyl alcohol and the like or in the presence of glacial acetic acid at a temperature ranging from 100–120° C. for a period of time ranging from 5 minutes to 1 hour.

The reaction involved in this case by utilizing, for example, chloracetic acid is believed to take place as follows:

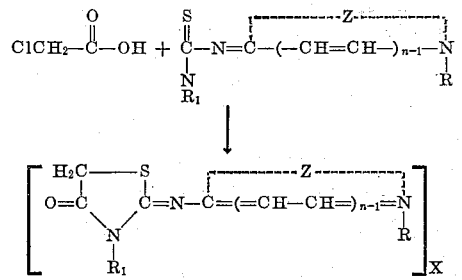

wherein $n$, R, R$_1$ Z, and X have the same values as above.

The following examples describe the preparation of some of the N-substituted thioureas, which are, as shown hereinafter, converted to azathiazolone cyanine dyes.

*Example I*

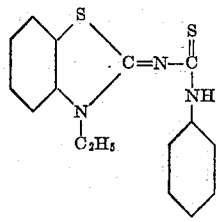

N-(3-ethyl-2-benzothiazolylidene)-N'-phenylthiourea 5.5 grams of 2-aminobenzothiazole ethiodide and 5 grams of phenyl isothiocyanate were dissolved in 10 mls. of hot pyridine. The solution was heated slowly until its temperature reached 130° C. Upon cooling to 25° C., a yellow solid crystallized which was filtered off, washed with water, dried, and purified by recrystallization from methanol. The product was dried at 85° C. A yield of 5.4 grams was obtained, melting at 158° C.

*Example II*

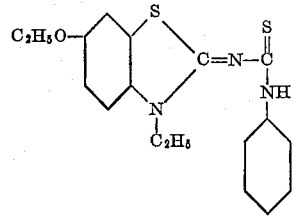

N-(3-ethyl-6-ethoxy-2-benzothiazolylidene)-N'-phenylthiourea 8 grams of 2-amino-6-ethoxybenzothiazole ethiodide and 5 grams of phenyl isothiocyanate were dissolved in 10 mls. of boiling pyridine. The resulting solution was stirred and slowly heated to 150° C. while permitting the pyridine to distill. Heating was discontinued, but stirring was kept up until the reaction mass cooled to 25° C. A yellowish solid separated which was washed with two 25 ml. portions of water, then triturated with 20 mls. of methanol and filtered. After consecutive washings with water and methanol, the solid was dried overnight at 80° C. 6 grams of a purified product were obtained which melted at 177–180° C.

*Example III*

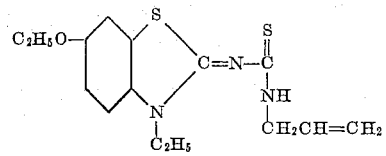

N-(3-ethyl-6-ethoxy-2-benzothiazolylidene)-N'-allyl-thiourea 7 grams of 2-amino-6-ethoxybenzothiazole ethiodide and 5 grams of allyl isothiocyanate were heated together in 5 mls. of boiling pyridine. Heating was continued until the internal temperature reached 150° C. The reaction mixture was cooled to room temperature and poured into 10 mls. of water. The yellow solid which separated was triturated with three fresh 10 ml. portions of methanol, filtered, washed alternately with water and methanol, and dried. The product melted at 119–122° C.

*Example IV*

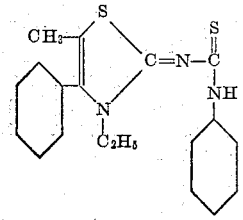

N-(3-ethyl-5-methyl-4-phenyl-2-thiazolylidene)-N'-phenylthiourea 6 grams of 2-amino-5-methyl-4-phenyl-2-thiazole ethiodide and 4 grams of phenyl isothiocyanate were dissolved in 10 mls. of hot pyridine. The resulting solution was heated until its internal temperature reached 140° C. The mixture was stirred slowly until cooled to 25° C. A solid separated which was diluted with 10 mls. of isopropyl alcohol, filtered, repeatedly washed with isopropyl alcohol and dried. 4.7 grams of a lemon-white solid were obtained which melted at 183–185° C.

Example V

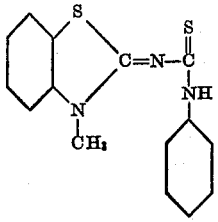

N-(3-methyl-2-benzothiazolylidene)-N'-phenylthiourea

This product was prepared from 5 grams of 2-aminobenzothiazole methiodide and 5 grams of phenyl isothiocyanate by following the general procedure of Example I.

Example VI

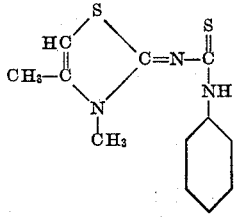

N-(3,4-dimethyl-2-thiazolylidene)-N'-phenylthiourea 100 grams of 2-amino-4-methylthiazole dimethylsulfate and 5.7 grams of phenyl isothiocyanate were heated slowly together until the temperature of the reaction mixture reached 140° C. At this point, heating was discontinued and the mass stirred constantly until it had reached room temperature. Crystals separated when the mass was diluted with a mixture of 200 mls. of equal parts of water and isopropanol. The crystals were filtered off, washed in isopropyl alcohol, and dried.

The following examples describe the preparation of the azathiazolone cyanine dyes from the foregoing N-substituted thioureas.

Example VII

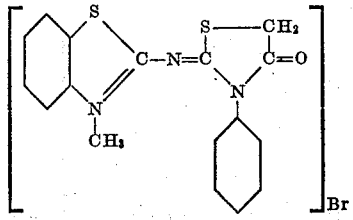

One gram of the product of Example V and 1 gram of bromacetic acid were dissolved in 5 mls. of glacial acetic acid and heated for 5 minutes. The solution was cooled to room temperature, diluted with 10 mls. of ether, and stirred vigorously until a yellow fluffy solid separated. The crystals were filtered off and repeatedly washed with ether.

Example VIII

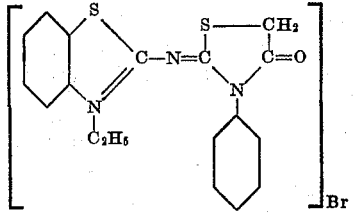

5.4 grams of the compound of Example I and 5 grams of bromacetic acid were boiled together in 20 mls. of glacial acetic acid for 5 minutes. The cooled solution was poured into 40 mls. of ether. A yellow crystalline solid precipitated which was washed with ether.

Example IX

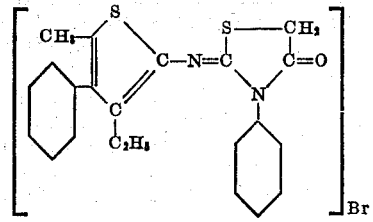

5 grams of the product of Example IV and 3 grams of bromacetic acid were heated together for 20 minutes in boiling n-butanol. The mixture was cooled in ice and stirred until muddy-yellow crystals separated. After 10 mls. of isopropanol had been added, the crystals were filtered off, and washed with ether.

Example X

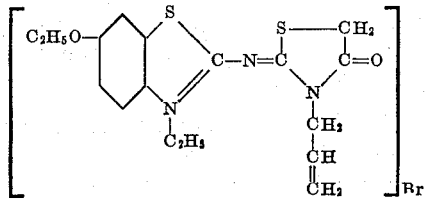

This product, obtained in the form of a fine yellow solid, was prepared from 2 grams of the compound of Example III and 2.2 grams of bromacetic acid by following the procedure of Example VI.

Example XI

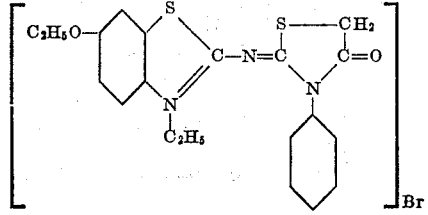

This product was obtained by a process analogous to the one described in Example VII but using 3.8 grams of the compound of Example II and 4 grams of bromacetic acid as starting materials.

Example XII

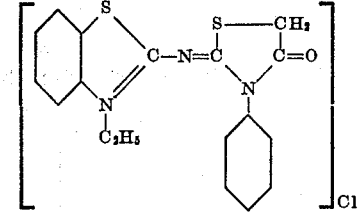

Example VIII was repeated with the exception that 2 grams of chloracetic acid were used in place of 5 grams of bromacetic acid.

Example XIII

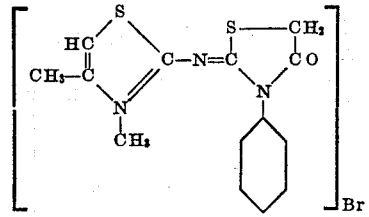

One gram of the compound of Example VI and 1 gram of bromacetic acid were heated together for 2 minutes in the presence of 10 mls. of glacial acetic acid. The pale yellow solution was cooled to room temperature, diluted with 30 mls. of ether, decanted, and triturated with an additional 30 mls. of anhydrous ether. A gummy solid was obtained which was used directly in dye synthesis.

The foregoing dye salts may be converted to salts other than chloride or bromide by treating the halogen salt with an aqueous or aqueous-alcohol solution containing a sodium or potassium salt of perchloric, hydroiodic, or thiocyanic acid.

The foregoing azathiazolone cyanine dyes may be employed as sensitizers for silver halide emulsions and as intermediates for the preparation of various types of tri- and tetra-nuclear cyanine dyes.

While there have been pointed out above certain preferred embodiments of the invention, the same is not limited to the foregoing examples, illustrations, or to the specific details given therein, but is capable of variations and modifications as to the reactants, proportions, and conditions employed.

I claim:

1. Azathiazolone cyanine dyes characterized by the following general formula:

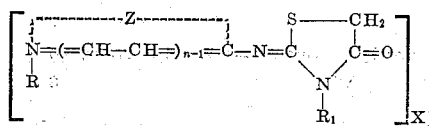

wherein R represents a member selected from the class consisting of alkyl, hydroxyalkyl, alkoxyalkyl, aryl, and aralkyl groups, $R_1$ represents a member selected from the class consisting of alkyl, allyl, aryl, and aralkyl groups, X represents an acid radical, Z represents the residue of a heterocyclic nitrogenous nucleus of the type common in cyanine dyes, and $n$ represents an integer from 1 to 2.

2. An azathiazolone dye characterized by the following formula:

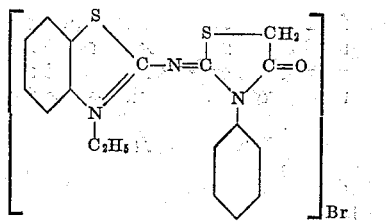

3. An azathiazolone dye characterized by the following formula:

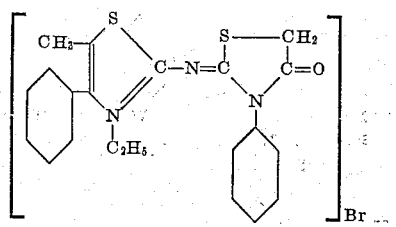

4. An azathiazolone dye characterized by the following formula:

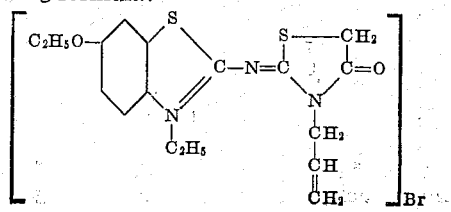

5. An azathiazolone dye characterized by the following formula:

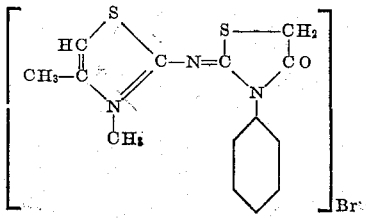

6. An azathiazolone dye characterized by the following formula:

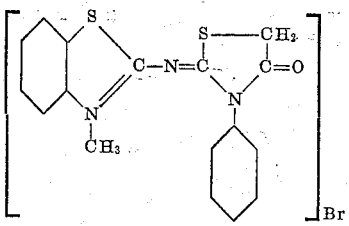

7. A process for the production of azathiazolone dyestuffs which comprises heating a compound of the general formula:

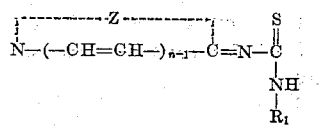

wherein Z represents the residue of a heterocyclic nucleus of the type common in cyanine dyes, R represents a member selected from the class consisting of alkyl, hydroxyalkyl, alkoxyalkyl, aryl, and aralkyl groups, $R_1$ represents a member selected from the class consisting of alkyl, allyl, aryl, and aralkyl groups, and $n$ represents an integer from 1 to 2 with an $\alpha$-halogen acetic acid.

8. A process for the production of an azathiazolone dye characterized by the following formula:

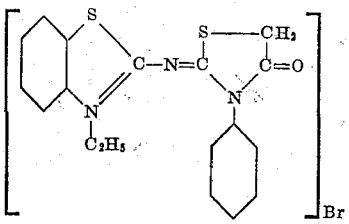

which comprises heating a compound having the following formula:

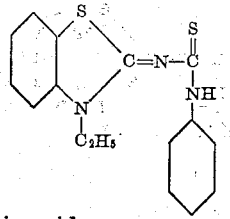

with bromacetic acid.

9. A process for the production of an azathiazolone dye characterized by the following formula:

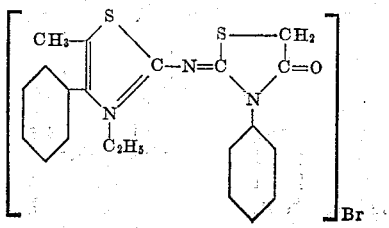

which comprises heating a compound having the following formula:

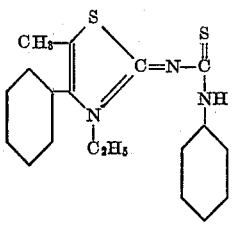

with bromacetic acid.

10. A process for the production of an azathiazolone dye characterized by the following formula:

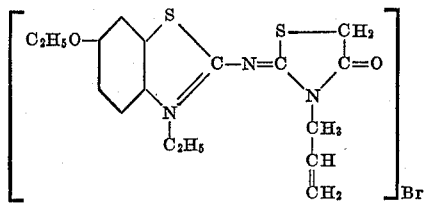

which comprises heating a compound having the following formula:

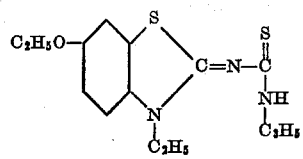

with bromacetic acid.

11. A process for the production of an azathiazolone dye characterized by the following formula:

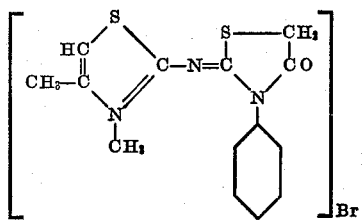

which comprises heating a compound having the following formula:

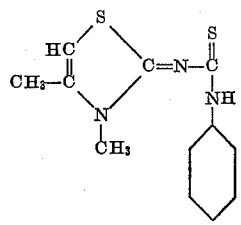

with bromacetic acid.

12. A process for the production of an azathiazolone dye characterized by the following formula:

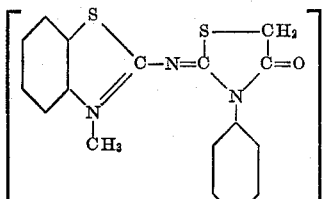

which comprises heating a compound having the following formula:

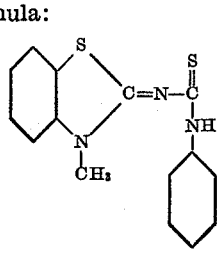

with bromacetic acid.

HENRY G. DERBYSHIRE.

REFERENCES CITED

The following references are of record in the file of this patent:

UNITED STATES PATENTS

| Number | Name | Date |
|---|---|---|
| 2,394,067 | Kendall | Feb. 5, 1946 |
| 2,464,785 | Thompson | Mar. 22, 1949 |

OTHER REFERENCES

Schneider et al.: Berichte, vol. 57, pages 522-532 (1924).